(12) United States Patent
Chung et al.

(10) Patent No.: US 11,632,716 B2
(45) Date of Patent: Apr. 18, 2023

(54) WIRELESS COMMUNICATION METHOD USED IN WIRELESS COMMUNICATION DEVICE AND WIRELESS COMMUNICATION DEVICE

(71) Applicant: Wistron NeWeb Corporation, Hsinchu (TW)

(72) Inventors: Chih-Wei Chung, Hsinchu (TW); Chui-Chu Cheng, Hsinchu (TW); Ying-Chuan Chen, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 87 days.

(21) Appl. No.: 17/367,405

(22) Filed: Jul. 4, 2021

(65) Prior Publication Data
US 2022/0060979 A1 Feb. 24, 2022

(30) Foreign Application Priority Data
Aug. 24, 2020 (TW) .................. 109128827

(51) Int. Cl.
*H04W 48/16* (2009.01)
*H04W 48/20* (2009.01)
*H04W 40/24* (2009.01)
*H04W 84/18* (2009.01)

(52) U.S. Cl.
CPC ......... *H04W 48/20* (2013.01); *H04W 40/248* (2013.01); *H04W 48/16* (2013.01); *H04W 84/18* (2013.01)

(58) Field of Classification Search
CPC ... H04W 48/20; H04W 40/248; H04W 48/16; H04W 84/18; H04W 24/10; H04W 24/02; H04W 40/22; H04W 88/08
See application file for complete search history.

(56) References Cited

U.S. PATENT DOCUMENTS

| | | | |
|---|---|---|---|
| 9,648,548 B1* | 5/2017 | Gan | H04L 67/12 |
| 2009/0059815 A1* | 3/2009 | Cheng | H04W 72/1278 370/254 |
| 2016/0219591 A1* | 7/2016 | Lee | H04W 40/244 |
| 2017/0135033 A1* | 5/2017 | Vecera | H04W 48/06 |
| 2019/0334766 A1* | 10/2019 | Lee | H04W 40/005 |

FOREIGN PATENT DOCUMENTS

| | | |
|---|---|---|
| CN | 106685833 A | 5/2017 |
| CN | 104717709 B | 8/2018 |

\* cited by examiner

*Primary Examiner* — Said M Elnoubi
(74) *Attorney, Agent, or Firm* — Winston Hsu

(57) ABSTRACT

A wireless communication method used in a wireless communication device, wherein the wireless communication method includes the steps of: establishing a link with a first access point, and obtaining a backhaul SSID of a self-organizing network including the first access point from the first access point; referring to the backhaul SSID to obtain first access point information of the first access point and second access point information of a second access point within the self-organizing network, wherein each of the first access point information and the second access point information includes a BSSID; and selecting one of the first access point and the second access point to perform a wireless network connection according to the first access point information and the second access point information.

20 Claims, 8 Drawing Sheets

WIRELESS COMMUNICATION METHOD USED IN WIRELESS COMMUNICATION DEVICE AND WIRELESS COMMUNICATION DEVICE

BACKGROUND OF THE INVENTION

1. Field of the Invention

The present invention relates to wireless communication, and more particularly, to a wireless communication device and a wireless communication method used in the wireless communication device.

2. Description of the Prior Art

In order to prevent the wireless communication quality from being affected by blind spot of the wireless network during users communicating with each other, the Self-Organizing Network (SON) was developed to connect various access points to make access points be automatically connected to each other and coordinate operations to expand network coverage.

The access points can be connected to each other through wired or wireless means, that is, using Ethernet or Wi-Fi for connecting. When an access point uses the wireless means to connect to other access point, the access point needs to know a basic service set identifier (BSSID) of the other access points in order to select the best access point to connect. Under general circumstances, the access point can use the service set identifier (SSID) and passive scanning to find nearby access points to obtain the BSSIDs of other access points. However, due to certain security considerations, some access points in a self-organizing network may choose to hide their backhaul SSID, such that the access point cannot obtain the BSSIDs of other access points through passive scanning. In the case that passive scanning is not available, the access point may use an active scan method, that is, actively send a probe request and listen to probe responses from other access points. However, under the dynamic frequency selection (DFS) channel, relevant regulations do not allow access points to use active scanning, thereby preventing radar operations from interference.

Therefore, in the above situations, users can only manually input the BSSID of another access point into the access point. However, the manual operation causes inconvenience to users.

SUMMARY OF THE INVENTION

One of the objectives of the present invention is to provide a wireless communication method and a related wireless communication device, which can automatically obtain the BSSIDs of other access points to select an appropriate access point for connection without user's manual input of BSSIDs of other access points, to solve problems of the prior art.

An embodiment of the present invention discloses a wireless communication method used in a wireless communication device. The wireless communication method includes: establishing a link with a first access point within a self-organizing network (SON), and obtaining a backhaul service set identifier (SSID) of the self-organizing network from the first access point; referring to the backhaul SSID to obtain access point information of at least one second access point within the self-organizing network, wherein the access point information of each of said at least one second access point comprises a basic SSID (BSSID); and selecting one of the first access point and said at least one second access point to perform a wireless network connection according to the access point information of said at least one second access point.

An embodiment of the present invention further discloses a wireless communication device including a wireless network module and a processor. The processor establishes a link with a first access point within a self-organizing network (SON) through the wireless network module, and obtains a backhaul service set identifier (SSID) of the self-organizing network from the first access point, and refers to the backhaul SSID to obtain access point information of at least one second access point within the self-organizing network. The access point information of each of said at least one second access point comprises a basic SSID (BSSID); and the processor selects one of the first access point and said at least one second access point to perform a wireless network connection through the wireless network module according to the access point information of said at least one second access point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
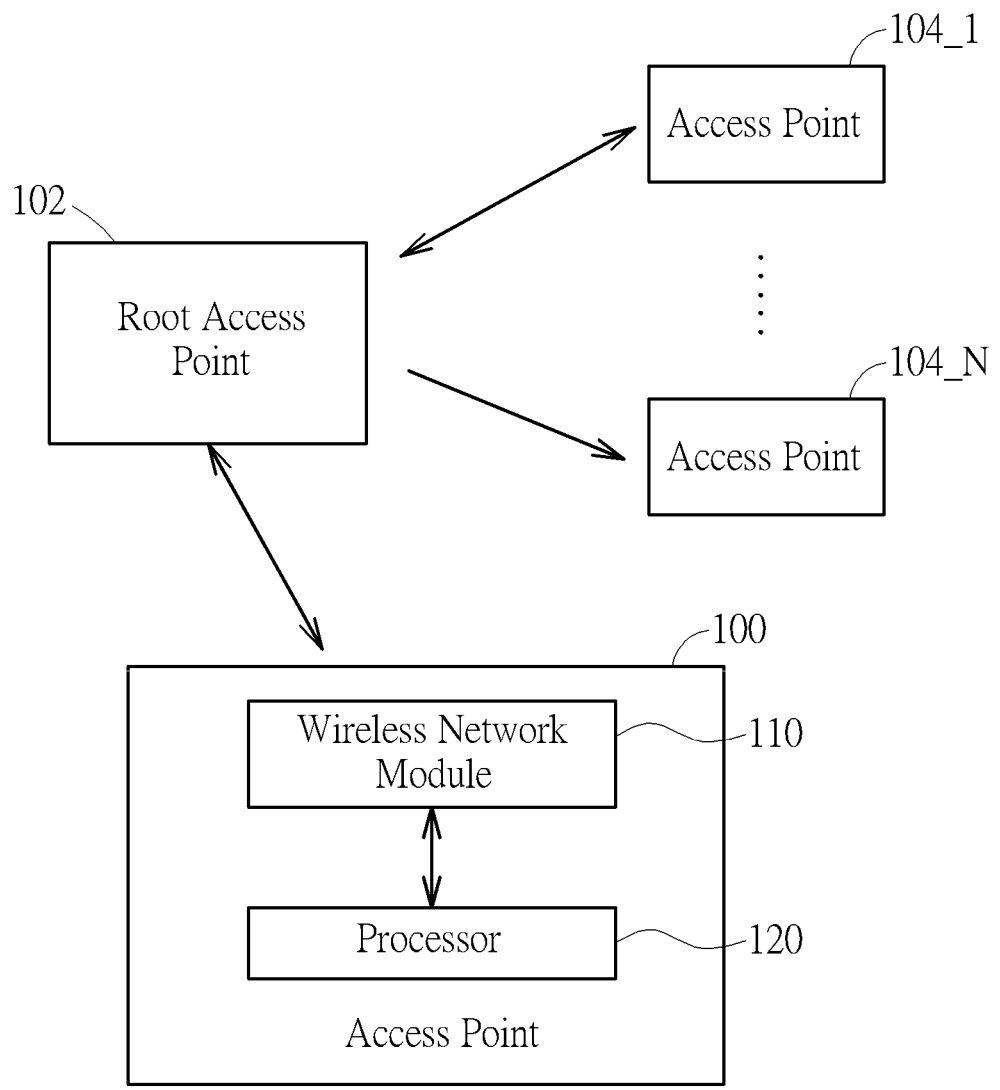
FIG. 1 is a diagram illustrating a wireless communication system according to a first embodiment of the present invention.

FIG. 1 is a diagram illustrating a wireless communication system according to an embodiment of the present invention. As shown in FIG. 1, the wireless communication system includes a plurality of wireless communication devices that can be connected to each other. In the present embodiment, the plurality of wireless communication devices are access points 100, 104_1-104_N, and a root access point 102. Each access point (e.g., access point 100) includes a wireless network module 110 and a processor 120, wherein the wireless network module 110 includes an antenna and a related front-end circuit, and the processor 120 is configured for wireless communication with other electronic devices through the wireless network module 110.

In the present embodiment, the wireless communication system includes a self-organizing network (SON), and the self-organizing network is a network with a specific topology centered on the root access point 102, such as a star network shown in FIG. 1 with the root access point 102 as the center. In the self-organizing network, each access point has the same fronthaul SSID that is used by external terminal devices (e.g., mobile phones, laptops, etc.) to connect to the wireless network, and the wireless communication between the terminal device and the access point is carried out in the 2.4 GHz (gigahertz) band or the 5 GHz band; in addition, each access point also has the same backhaul SSID for allowing access points to communicate with each other, and the wireless communication between the access points is carried out in the 5 GHz band.

When a new access point, such as the access point 100, wants to join the self-organizing network centered on the root access point 102 and select a most appropriate access point to connect, the backhaul SSID of the self-organizing network and the BSSID of each access point are required. However, when the backhaul wireless communication of the self-organizing network is operated on a dynamic frequency selection (DFS) channel and the access of the self-organizing network uses a security mechanism that hides the SSID, the access point 100 cannot send a probe request to obtain the BSSIDs of other access points due to Wi-Fi regulations, and the beacons sent from other access points do not carry the backhaul SSID. Therefore, the present embodiment proposes a new connection method in which a new access point can connect to the root access point 102 in the self-organizing network through the Wi-Fi Protected Setup (WPS) mechanism, and can further obtain the backhaul SSID and the BSSIDs of all other access points from the root access point 102.

Figure 2:
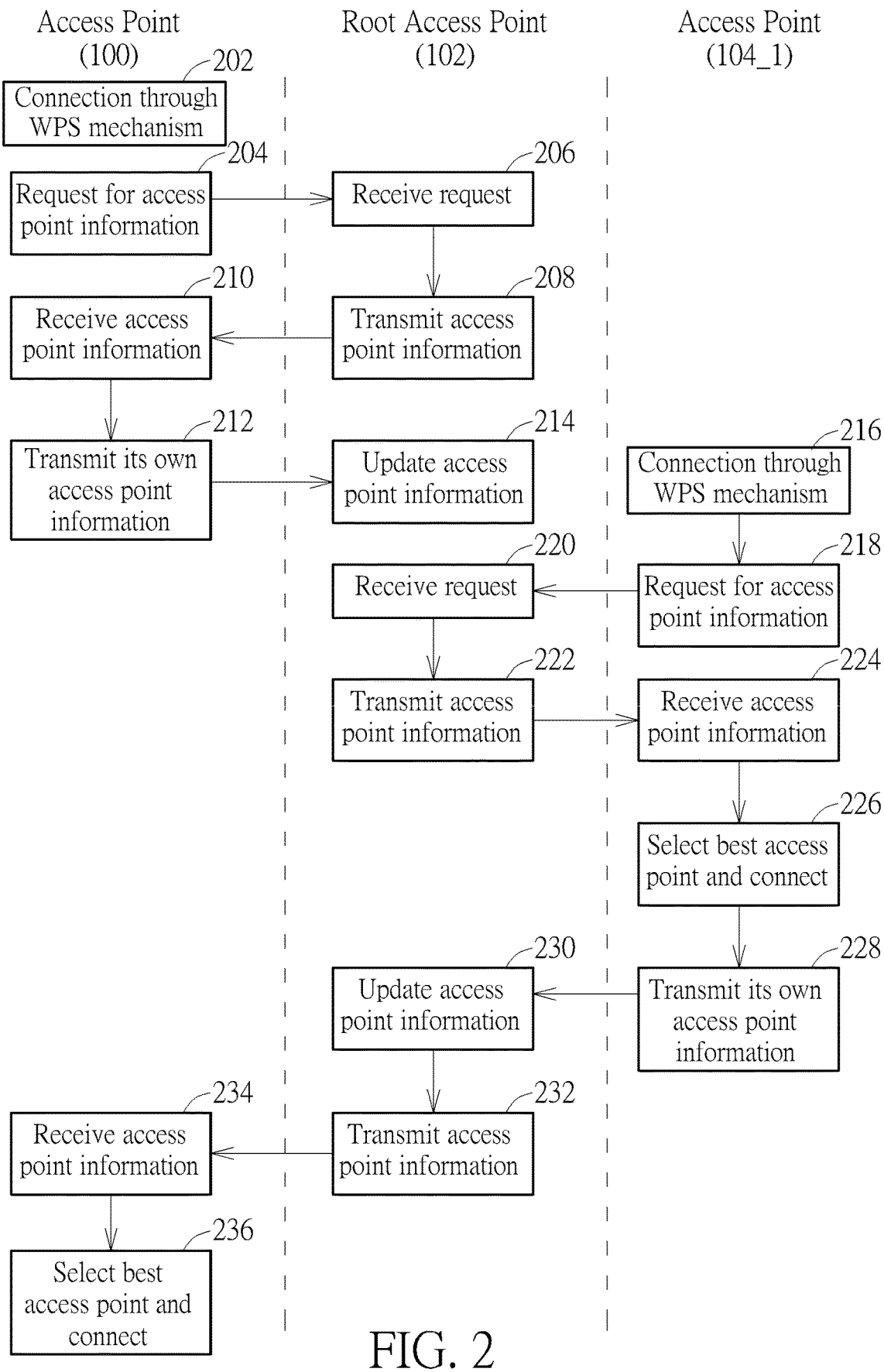
FIG. 2 is a flowchart illustrating a wireless communication method used by the wireless communication system of FIG. 1.

Specifically, please referring to the flowchart of the wireless communication method shown in FIG. 2, the flow shown in FIG. 2 assumes that the root access point 102 is not connected to any other access points at the beginning of the wireless communication method. In step 202, the access point 100 connects to the root access point 102 through the WPS mechanism and obtains the backhaul SSID. In step 204, the access point 100 requests the root access point 102 for access point information of the access points in the self-organizing network. In step 206, the root access point 102 receives the request from the access point 100. In step 208, the root access point 102 transmits all current access point information to the access point 100. Since the root access point 102 is not connected to any other access points at this moment, the root access point 102 only has its own access point information. Hence, the root access point 102 only transmits its own access point information to the access point 100. In step 210, the access point 100 receives the access point information of the root access point 102. In the present embodiment, the access point information includes the BSSID and a hop count, where the BSSID can include a media access control address (MAC address), and the hop count is a number of access points through which the wireless communication between the access point and the root access point 102 traverses. For the root access point 102, the hop count is zero. In step 212, the access point 100 transmits its own access point information to the root access point 102, where the access point information of the access point 100 includes its own BSSID and the hop count (the current hop count is "1"). In step 214, the root access point 102 updates its stored access point information, that is, the root access point 102 currently stores the access point information of the root access point 102 and the access point 100.

In step 216, the access point 104_1 connects with the root access point 102 through the WPS mechanism, and obtains the backhaul SSID. In step 218, the access point 104_1 requests the root access point 102 for the access point information of the access points in the self-organizing network. In step 220, the root access point 102 receives the request from the access point 104_1. In step 222, the root access point 102 sends all the current access point information to the access point 104_1. At this time, the root access point 102 sends its own access point information and the access point information of the access point 100 to the access point 104_1. In step 224, the access point 104_1 receives the access point information of the root access point 102 and the access point information of the access point 100. In step 226, the access point 104_1 can refer to the hop count included in the access point information, and/or obtain the signal quality between the access point 104_1 and the root access point 102, and/or obtain the signal quality between the point 104_1 and the access point 100, to select one of the root access point 102 and the access point 100 for connection. In one example, the access point 104_1 can directly select an access point with a smaller hop count to connect, or the access point 104_1 can select the access point with the best received signal strength indication (RSSI) according to the RSSI that can be measured without connection, and connect through the BSSID of the access point.

In step 228, the access point 104_1 sends its own access point information to the root access point 102, where the access point information of the access point 104_1 may include its own BSSID and the hop count. If the access point 104_1 is connected to the root access point 102 in step 226, the hop count is "1". If the access point 104_1 is connected to the access point 100 in step 226, the hop count is "2". In step 230, the root access point 102 updates its stored access point information, that is, the root access point 102 currently stores the access point information of the root access point 102, the access point 100 and the access point 104_1.

Since the access point information of the root access point 102 is updated, the root access point 102 transmits the updated access point information to the access point 100 (step 232), and the access point 100 receives the updated access point information including the access point information of the root access point 102, the access point 100 and the access point 104_1 (step 234). In step 236, the access point 100 can refer to the hop count included in the access point information, and/or obtain the signal quality between the access point 100 and the root access point 102, and/or obtain the signal quality between the access point 100 and the access point 104_1, to select one of the root access point 102 and the access point 104_1 for connection.

FIG. 2 shows that only two access points 100 and 104_1 use the WPS mechanism for connecting to the root access point 102 to obtain the backhaul SSID and the access point information of each access point that are used for the process of best access point selection and connection. However, since those skilled in the art should be able to understand the process of adding other access points to this self-organizing network after reading the content of this embodiment, further description is omitted here for simplicity.

In addition, the embodiment in FIG. 2 allows new access points to quickly and effectively join the self-organizing network and to obtain access point information of all access points so as to select the best access point for connection, even in the situation that the backhaul wireless communication of the self-organizing network is operating in the DFS channel and the self-organizing network is accessed using a security mechanism that hides the SSID.

Figure 3:
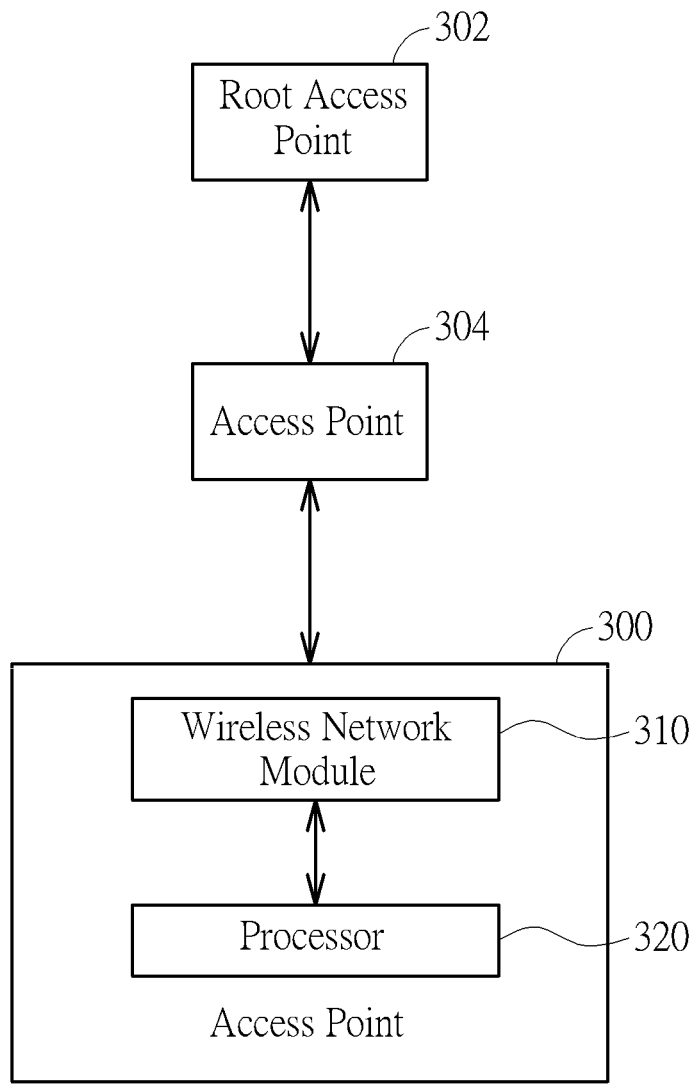
FIG. 3 is a diagram illustrating a wireless communication system according to a second embodiment of the present invention.

FIG. 3 is a diagram illustrating a wireless communication system according to another embodiment of the present invention. As shown in FIG. 3, the wireless communication system includes multiple wireless communication devices that can be connected to each other. In this embodiment, the multiple wireless communication devices are access points 300 and 304 and a root access point 302. Each access point (e.g., access point 300) includes a wireless network module 310 and a processor 320, wherein the wireless network module 310 includes an antenna and a related front-end circuit, and the processor 320 is configured for wireless communication with other electronic devices through the wireless network module 310.

In this embodiment, the wireless communication system includes a self-organizing network (SON), and the self-organizing network takes the root access point 302 as a root to forma network of a specific topology, such as the chain network shown in FIG. 3. In the self-organizing network, each access point has the same fronthaul SSID that is used by external terminal devices to connect to the wireless network, and the wireless communication between the terminal device and the access point is in the 2.4 GHz band or the 5 GHz band; in addition, each access point also has the same backhaul SSID for allowing access points to connect to each other, and the wireless communication with the access points is carried out in the 5 GHz band.

In this embodiment, when a new access point, such as access point 300, wants to join the self-organizing network and select a most appropriate access point for connection, the new access point can use the WPS mechanism to connect with one of the access points in the self-organizing network to obtain the backhaul SSID and join the self-organizing network, and can further obtain the BSSIDs of all other access points from the root access point 302 to select a best access point to connect.

Figure 4:
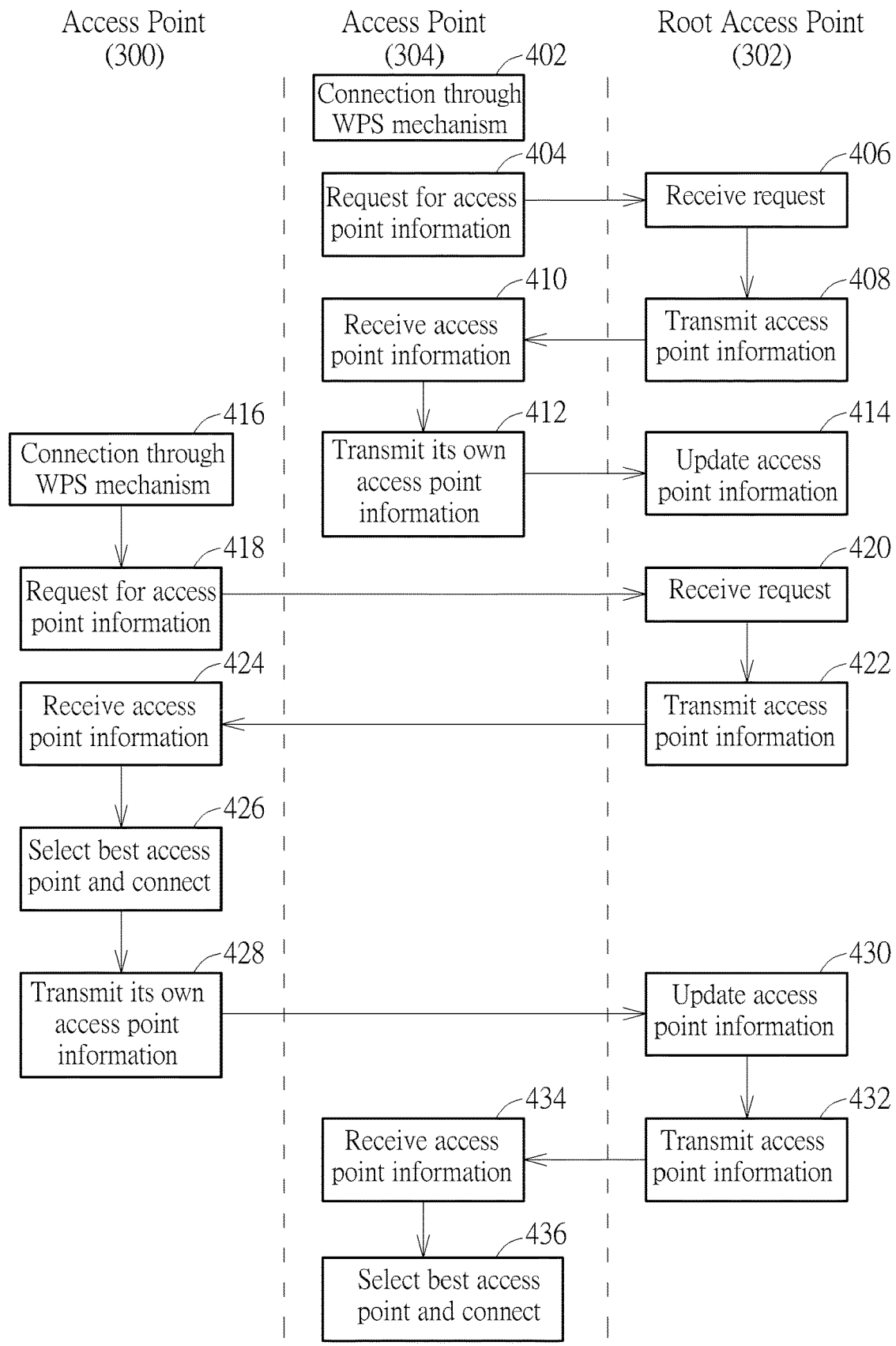
FIG. 4 is a flowchart illustrating a wireless communication method used by the wireless communication system of FIG. 3.

Specifically, referring to the flowchart of the wireless communication method shown in FIG. 4, the flow shown in FIG. 4 assumes that the root access point 302 is not connected to any other access points at the beginning of the wireless communication method. In step 402, the access point 304 connects to the root access point 302 through the WPS mechanism and obtains the backhaul SSID. In step 404, the access point 304 requests the root access point 302 for the access point information of the access points in the self-organizing network. In step 406, the root access point 302 receives the request from the access point 304. In step 408, the root access point 302 transmits all current access point information to the access point 304. Since the root access point 302 is not currently connected to other access points, the root access point 302 only has its own access point information. Hence, the root access point 302 only transmits its own access point information to the access point 304. In step 410, the access point 304 receives the access point information of the root access point 302. In this embodiment, the access point information includes the BSSID and the hop count. In step 412, the access point 304 transmits its own access point information to the root access point 302, where the access point information of the access point 304 may include its own BSSID and the hop count (the current hop count is "1"). In step 414, the root access point 302 updates its stored access point information, that is, the root access point 302 currently stores the access point information of the root access point 302 and the access point 304.

In step 416, the access point 300 connects to the access point 304 through the WPS mechanism, and obtains the backhaul SSID. In step 418, since the access point 300 has obtained the backhaul SSID, the access point 300 can send packets to request access point information of other access points. In step 420, the root access point 302 receives the request from the access point 300. In step 422, the root access point 302 sends all current access point information. At this time, the root access point 302 sends its own access point information and the access point information of the access point 304. In step 424, the access point 300 receives the access point information of the root access point 302 and the access point 304. In step 426, the access point 300 can refer to the hop count included in the access point information, and/or obtain the signal quality between the access point 300 and the root access point 302, and/or obtain the signal quality between the access point 300 and the access point 304, to select one of the root access point 302 and the access point 304 for connection. In one example, the access point 300 can directly select an access point with a smaller hop count for connection, or can select the access point with the best RSSI according to the RSSI that can be measured without connection, and connect through the BSSID of the access point.

In step 428, the access point 300 transmits its own access point information to the root access point 302, where the access point information of the access point 300 includes its own BSSID and the hop count. If the access point 300 is connected to the root access point 302 (step 426), the hop count is "1". If the access point 300 is connected to the access point 304 (step 426), the hop count is "2". In step 430, the root access point 302 updates its stored access point information, that is, the root access point 302 currently stores the access point information of the root access point 302, the access point 300 and the access point 304.

Since the access point information in the root access point 302 is updated, the root access point 302 transmits the updated access point information to the access point 304 (step 432), and the access point 304 receives the updated access point information including the access point information of the root access point 302, the access point 300, and the access point 304 (step 434). In step 436, the access point 304 can refer to the hop count included in the access point information, and/or obtain the signal quality between the access point 304 and the root access point 302, and/or obtain the signal quality between the access point 304 and the access point 300, to select one of the root access point 302 and the access point 300 for connection.

FIG. 4 shows that only the access point 300 uses the WPS mechanism to connect to the access point 304 to obtain the backhaul SSID, and obtains the access point information of each access point from the root access point 302, for the process of best access point selection and connection. However, since those skilled in the art should be able to understand the process of adding other access points to this self-organizing network after reading the content of this embodiment, further description is omitted here for simplicity.

In addition, the embodiment in FIG. 4 allows new access points to quickly and effectively join the self-organizing network and to obtain access point information of all access points, and then select the best access point for connection according to the access point information, even in the situation that the backhaul wireless communication of the self-organizing network is operating in the DFS channel and the self-organizing network is accessed using a security mechanism that hides the SSID.

Figure 5:
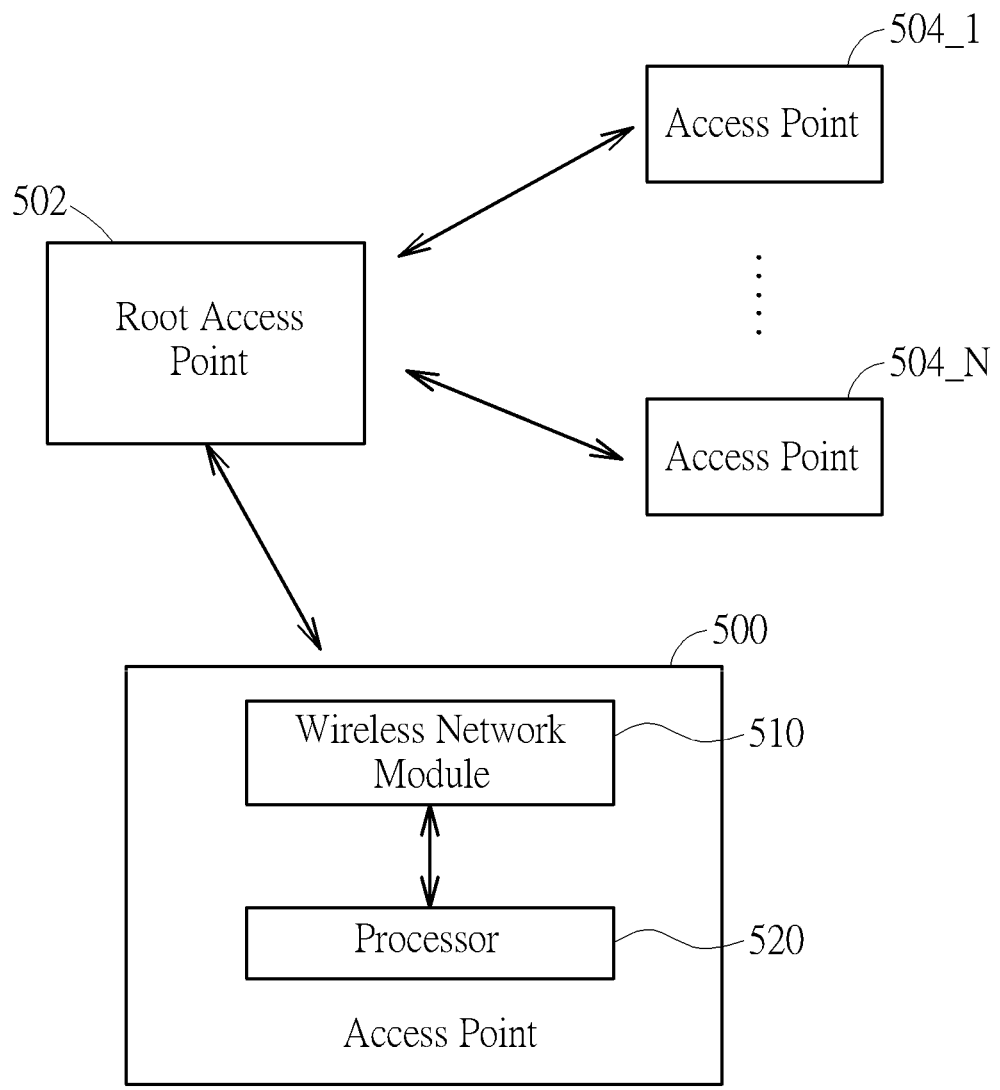
FIG. 5 is a diagram illustrating a wireless communication system according to a third embodiment of the present invention.

FIG. 5 is a diagram illustrating a wireless communication system according to an embodiment of the present invention. As shown in FIG. 5, the wireless communication system includes multiple wireless communication devices that can be connected to each other. In this embodiment, the multiple wireless communication devices are access points 500, 504_1 to 504_N and a root access point 502. Each access point (e.g., access point 500) includes a wireless network module 510 and a processor 520. The wireless network module 510 includes an antenna and a related front-end circuit, and the processor 520 is configured for wireless communication with other electronic devices through the wireless network module 510.

In this embodiment, the wireless communication system includes a self-organizing network (SON), and the self-organizing network takes the root access point 502 as a center to form a network of a specific topology, such as a star network shown in FIG. 5. In the self-organizing network, each access point has the same fronthaul SSID that is used by external terminal devices (e.g., mobile phones, laptops, etc.) to connect to the wireless network, and the wireless communication between the terminal device and the access point is in the 2.4 GHz band or the 5 GHz band. In addition, each access point also has the same backhaul SSID for allowing access points to connect to each other, and the wireless communication between the access points is carried out in the 5 GHz band.

When a new access point, such as the access point 500, wants to join the self-organizing network centered on the root access point 502 and select a most appropriate access point to connect, the backhaul SSID of the self-organizing network and the BSSID of each access point are required. However, when the backhaul wireless communication of the self-organizing network is operated on a DFS channel and the access of the self-organizing network uses a security mechanism that hides the SSID, the access point 500 cannot send a probe request to obtain the BSSIDs of other access points due to Wi-Fi regulations, and the beacons sent from other access points do not carry the backhaul SSID. Therefore, the present embodiment proposes a new connection method in which a new access point can connect to the root access point 502 in the self-organizing network through the WPS mechanism, and can further obtain the backhaul SSID and the fronthaul SSID of the self-organizing network, such that the new access point can obtain the BSSID of other access points based on the fronthaul SSID.

Figure 6:
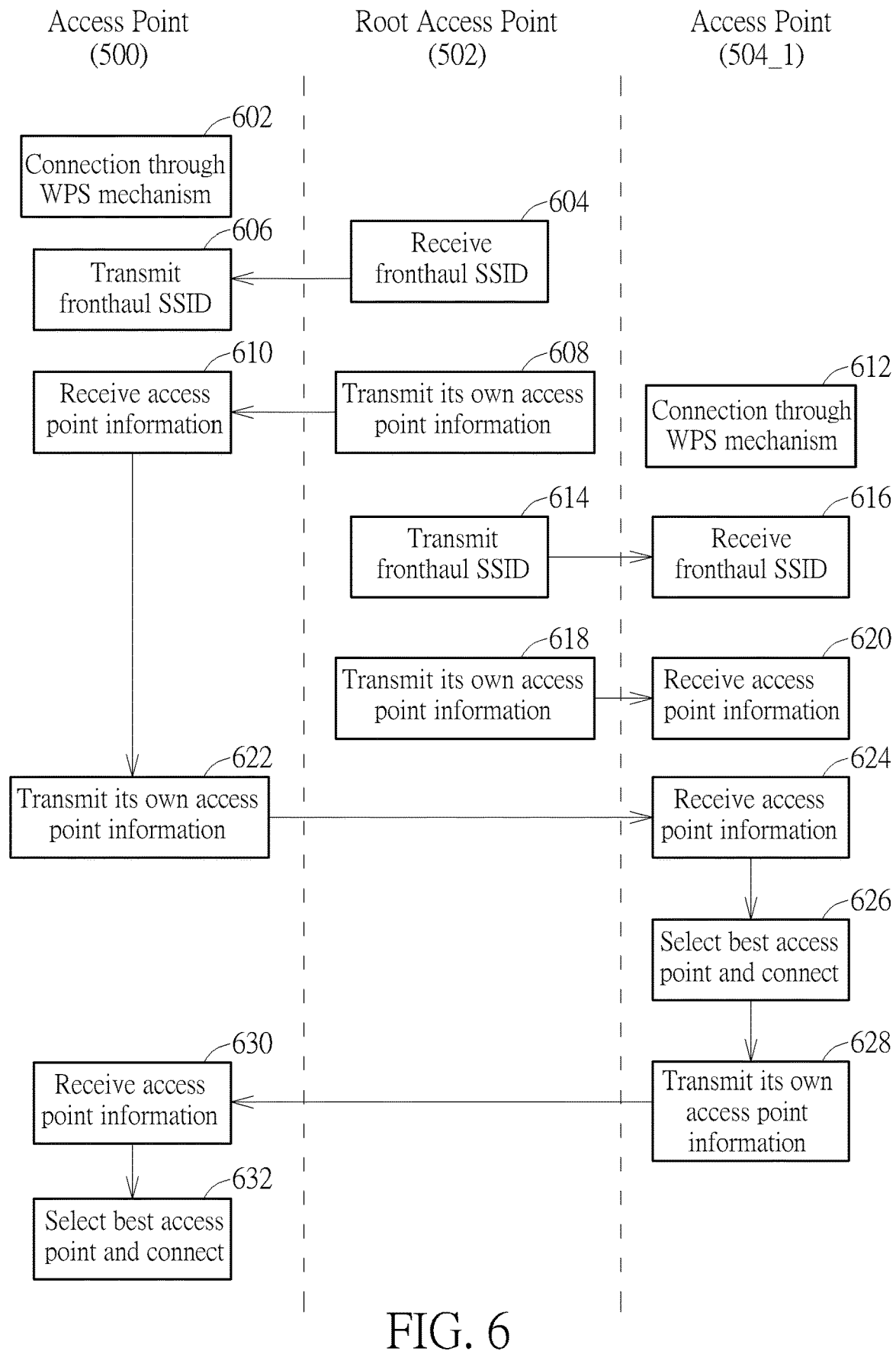
FIG. 6 is a flowchart illustrating a wireless communication method used by the wireless communication system of FIG. 5.

Specifically, please referring to the flowchart of the wireless communication method shown in FIG. 6, the flow shown in FIG. 6 assumes that the root access point 502 is not connected to any other access points at the beginning of the wireless communication method. In step 602, the access point 500 connects to the root access point 502 through the WPS mechanism and obtains the backhaul SSID. In step 604, the root access point 502 transmits the fronthaul SSID of the self-organizing network to the access point 500 based on the backhaul wireless network such as a non-DFS channel in the 5 GHz band. In step 606, the access point 500 receives the fronthaul SSID sent from the root access point 502. In steps 608 and 610, the root access point 502 transmits its own access point information based on the fronthaul wireless network (that is, based on the fronthaul SSID), such as 2.4 GHz band, and the access point 500 receives the access point information of the root access point 502, where the access point information includes the BSSID and the hop count. In this embodiment, the access point 500 can use passive scanning or active scanning to obtain the access point information of the root access point 502.

Regarding passive scanning, since the access point in the self-organizing network periodically sends a beacon with the fronthaul SSID and its own BSSID, the access point 500 can listen to multiple packets in the air (that is, the packets received by the wireless network module 510), identify multiple specific packets with fronthaul SSID in the multiple packets, and then obtain the access point information of the access point (s) according to the contents of the multiple specific packets. In this embodiment, when the access point 500 detects that the fronthaul SSID of the received packet is the same as the packet received in step 606, the access point 500 can determine that the packet is sent from the access point of the same self-organizing network. Hence, the access point 500 extracts the content of this packet to obtain the access point information of the root access point 502. On the other hand, regarding active scanning, the access point 500 can use the non-DFS channel in the 2.4 GHz band or the 5 GHz band to send a probe request, and listen to multiple specific packets sent by other access points in response to the probe request, and obtain access point information of other access points according to contents of the multiple specific packets. In detail, the probe request sent by the access point 500 includes the fronthaul SSID, and any other access point in the self-organizing network (such as the root access point 502) sends the access point information with its own BSSID and the hop count after receiving the probe request with the same fronthaul SSID.

In step 612, the access point 504_1 connects with the root access point 502 through the WPS mechanism, and obtains the backhaul SSID. In step 614, the root access point 502 transmits the fronthaul SSID of the self-organizing network to the access point 504_1 based on the backhaul wireless network such as a non-DFS channel in the 5 GHz band. In step 616, the access point 504_1 receives the fronthaul SSID transmitted from the root access point 502. In steps 618 and 620, the root access point 502 transmits its own access point information based on the fronthaul wireless network (that is, based on the fronthaul SSID), such as 2.4 GHz band, and the access point 504_1 receives the access point information of the root access point 502, where the access point information includes the BSSID and the hop count. In this embodiment, the access point 504_1 can use passive scanning or active scanning to obtain the access point information of the root access point 502.

In steps 622 and 624, the access point 500 transmits its own access point information based on the fronthaul wireless network (that is, based on the fronthaul SSID), and the access point 504_1 receives the access point information of the access point 500, where the access point information includes the BSSID and the hop count. In this embodiment, the access point 504_1 can also use passive scanning or active scanning to obtain the access point information of the access point 500. In step 626, the access point 504_1 can refer to the hop count included in the received access point information, and/or obtain the signal quality between the access point 504_1 and other access points (e.g., the root access point 502 and the access point 500), to select one of the root access point 502 and the access point 500 for connection. In one example, the access point 504_1 can directly select the access point with a smaller hop count to connect, or can select the access point with the best RSSI according to the RSSI that can be measured without connection, and connect through the BSSID of the access point.

In steps 628 and 630, the access point 504_1 transmits its own access point information based on the fronthaul wireless network (that is, based on the fronthaul SSID), and the access point 500 receives the access point information of the access point 504_1, where the access point information includes the BSSID and the hop count. In this embodiment, the access point 500 can also use passive scanning or active scanning to obtain the access point information of the access point 504_1. In step 632, the access point 500 can refer to the hop count included in the received access point information, and/or obtain the signal quality between the access point 500 and other access points (e.g., the root access point 502 and the access point 504_1), to select one of the root access point 502 and the access point 504_1 for connection.

FIG. 6 shows that only two access points 500 and 504_1 use the WPS mechanism to connect to the root access point 502 for obtaining the backhaul SSID and the fronthaul SSID, and obtain the access point information of other access points based on the fronthaul SSID, for the process of best access point selection and connection. However, since those skilled in the art should be able to understand the process of adding other access points to this self-organizing network after reading the content of this embodiment, further description is omitted here for simplicity.

In addition, the embodiment in FIG. 6 allows new access points to quickly and effectively join the self-organizing network and obtain access point information of all access points, and then select the best access point for connection according to the access point information, even in the situation that the backhaul wireless communication of the self-organizing network is operating in the DFS channel and the self-organizing network is accessed using a security mechanism that hides the SSID.

Figure 7:
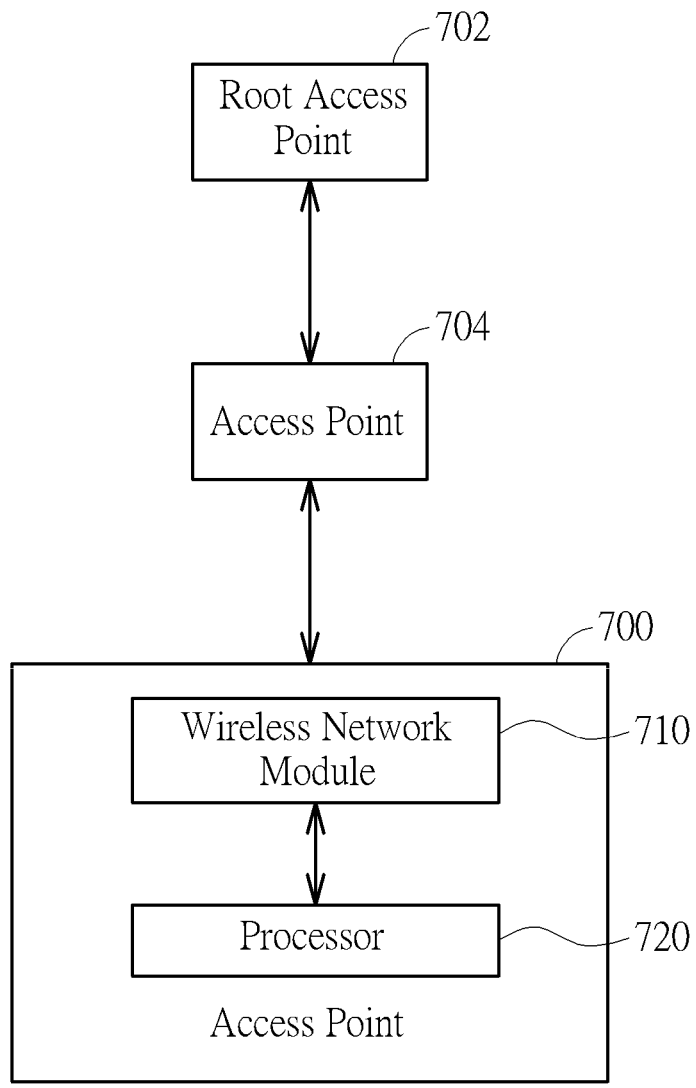
FIG. 7 is a diagram illustrating a wireless communication system according to a fourth embodiment of the present invention.

FIG. 7 is a diagram illustrating a wireless communication system according to an embodiment of the present invention. As shown in FIG. 7, the wireless communication system includes multiple wireless communication devices that can be connected to each other. In this embodiment, the multiple wireless communication devices are access points 700, 704 and a root access point 702. Each access point (e.g., access point 700) includes a wireless network module 710 and a processor 720. The wireless network module 710 includes an antenna and a related front-end circuit, and the processor 720 is configured for wireless communication with other electronic devices through the wireless network module 710.

In this embodiment, the wireless communication system includes a self-organizing network (SON), and the self-organizing network takes the root access point 702 as a root to form a network of a specific topology, such as the chain network shown in FIG. 7. In the self-organizing network, each access point has the same fronthaul SSID that is used by external terminal devices to connect to the wireless network, and the wireless communication between the terminal device and the access point is in the 2.4 GHz band or the 5 GHz band. In addition, each access point also has the same backhaul SSID for allowing access points to connect to each other, and the wireless communication between the access points is carried out in the 5 GHz band.

When a new access point, such as access point 700, wants to join the self-organizing network with the root access point 702 and select a most appropriate access point for connection, this embodiment provides a new connection method, wherein the new access point can use the WPS mechanism to connect with one of the access points in the self-organizing network to obtain the backhaul SSID, and obtain the fronthaul SSID of the self-organizing network from the access point, such that the new access point can obtain the BSSIDs of other access points based on the fronthaul SSID.

Figure 8:
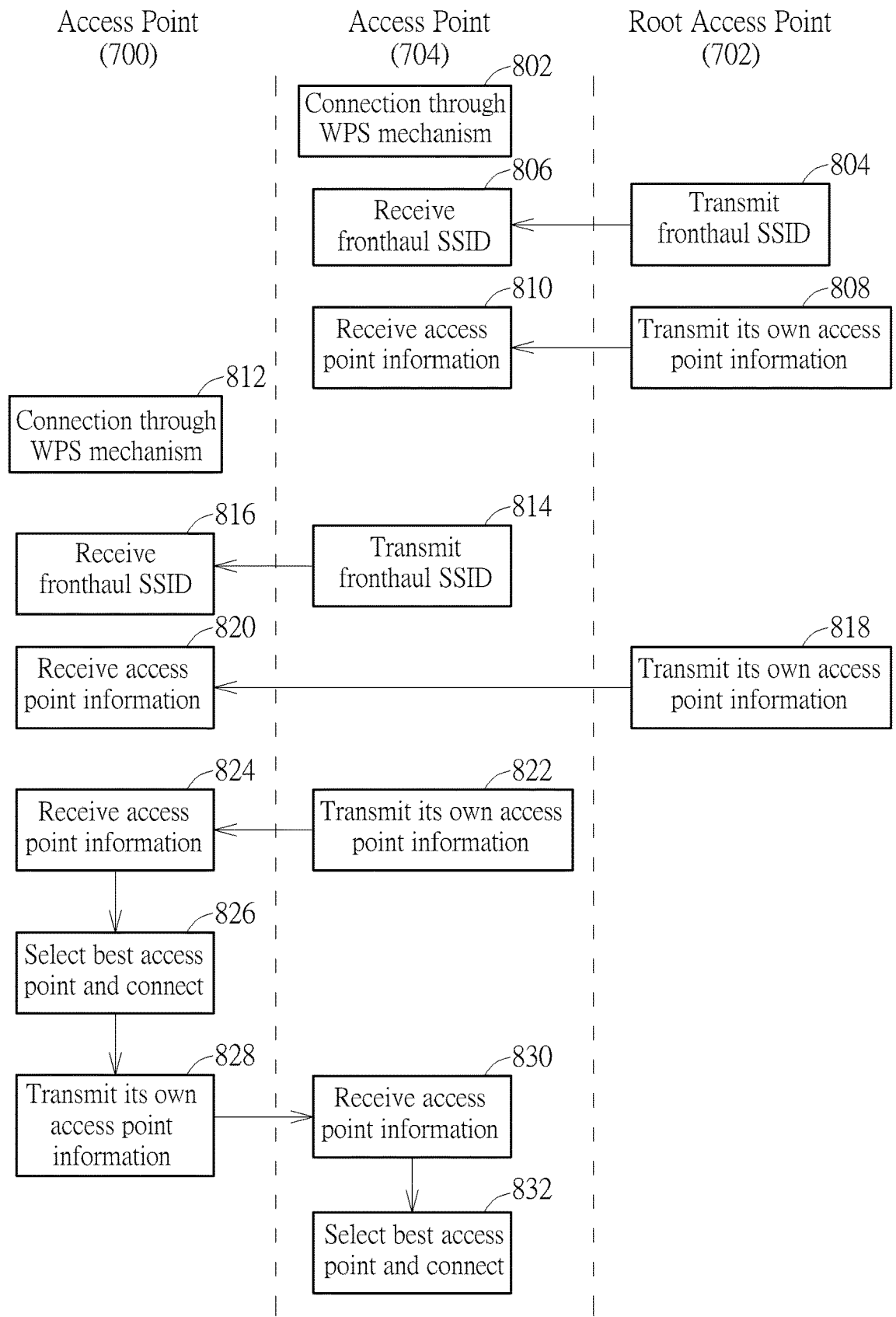
FIG. 8 is a flowchart illustrating a wireless communication method used by the wireless communication system of FIG. 7.

Specifically, referring to the flowchart of the wireless communication method shown in FIG. 8, the flow shown in FIG. 8 assumes that the root access point 702 is not connected to any other access points at the beginning. In step 802, the access point 704 connects to the root access point 702 through the WPS mechanism and obtains the backhaul SSID. In step 804, the root access point 702 transmits the fronthaul SSID of the self-organizing network to the access point 704 based on the backhaul wireless network such as a non-DFS channel in the 5 GHz band. In step 806, the access point 704 receives the fronthaul SSID transmitted by the root access point 702. In steps 808 and 810, the root access point 702 transmits its own access point information based on the fronthaul wireless network (that is, based on the fronthaul SSID), such as 2.4 GHz band, and the access point 704 receives the access point information of the root access point 702, where the access point information includes the BSSID and the hop count. In this embodiment, the access point 704 can use passive scanning or active scanning to obtain the access point information of the root access point 702.

In step 812, the access point 700 connects with the access point 704 through the WPS mechanism, and obtains the backhaul SSID. In step 814, the access point 704 transmits the fronthaul SSID of the self-organizing network to the access point 700 based on the backhaul wireless network such as a non-DFS channel in the 5 GHz band. In step 816, the access point 700 receives the fronthaul SSID transmitted from the access point 704. Insteps 818 and 820, the root access point 702 transmits its own access point information based on the fronthaul wireless network (that is, based on the fronthaul SSID), and the access point 700 receives the access point information of the root access point 702, where the access point information includes the BSSID and the hop count. In this embodiment, the access point 700 can use passive scanning or active scanning to obtain the access point information of the root access point 702.

In steps 822 and 824, the access point 704 transmits its own access point information based on the fronthaul wireless network (that is, based on the fronthaul SSID), such as 2.4 GHz band, and the access point 700 receives the access point information of the access point 704, where the access point information includes the BSSID and the hop count. In this embodiment, the access point 700 can also use passive scanning or active scanning to obtain the access point information of the access point 704. In step 826, the access point 700 can refer to the hop count included in the received access point information, and/or obtain the signal quality between the access point 700 and other access points (e.g., the root access point 702 and the access points 704), to select one of the root access point 702 and the access point 704 for connection. In one example, the access point 700 can directly select the access point with a smaller hop count to connect, or can select the access point with the best RSSI according to the RSSI that can be measured without connection, and connect through the BSSID of the access point.

In steps 828 and 830, the access point 700 transmits its own access point information based on the fronthaul wireless network (that is, based on the fronthaul SSID), and the access point 704 receives the access point information of the access point 700, where the access point information includes the BSSID and the hop count. In this embodiment, the access point 704 can also use passive scanning or active scanning to obtain the access point information of the access point 700. In step 832, the access point 704 can refer to the hop count included in the received access point information, and/or obtain the signal quality between the access point 704 and other access points (e.g., the root access point 702 and the access points 700), to select one of the root access point 702 and the access point 700 for connection.

FIG. 8 shows that only two access points 700 and 704 use the WPS mechanism to obtain the backhaul SSID and the fronthaul SSID, and to obtain the access point information of other access points based on the fronthaul SSID, for the process of best access point selection and connection. However, since those skilled in the art should be able to understand the process of adding other access points to this self-organizing network after reading the content of this embodiment, further description is omitted here for simplicity.

In addition, the embodiment in FIG. 8 allows new access points to quickly and effectively join the self-organizing network, obtain access point information of all access points, and then select the best access point for connection according to the access point information, even in the situation that the backhaul wireless communication of the self-organizing network is operating in the DFS channel and the self-organizing network is accessed using a security mechanism that hides the SSID.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method used in a wireless communication device, comprising:
    establishing a link with a first access point within a self-organizing network (SON), and obtaining a backhaul service set identifier (SSID) of the self-organizing network from the first access point, wherein a backhaul wireless communication of the SON is operated on a dynamic frequency selection (DFS) channel, and an access of the SON uses a security mechanism that hides the backhaul SSID;
    referring to the backhaul SSID to obtain first access point information of the first access point and second access point information of a second access point within the self-organizing network, wherein each of the first access point information and the second access point information comprises a basic SSID (BSSID); and
    selecting one of the first access point and the second access point to perform a wireless network connection according to the first access point information and the second access point information.

2. The wireless communication method of claim 1, wherein the first access point is a root access point, and the step of referring to the backhaul SSID to obtain the first access point information of the first access point and the second access point information of the second access point within the self-organizing network comprises:
    obtaining the first access point information of the first access point and the second access point information of the second access point currently within the self-organizing network from the first access point.

3. The wireless communication method of claim 1, wherein the second access point information of the second access point comprises the BSSID and a hop count, the hop count is a number of access points through which wireless communication between the second access point and the first access point traverses; and the step of selecting one of the first access point and the second access point to perform the wireless network connection according to the first access point information and the second access point information comprises:
    obtaining signal quality information of each of the first access point and the second access point; and
    selecting one of the first access point and the second access point to perform the wireless network connection according to the second access point information of the second access point and the signal quality information of each of the first access point and the second access point.

4. The wireless communication method of claim 1, wherein the second access point comprises a root access point, and the step of referring to the backhaul SSID to obtain the first access point information of the first access point and the second access point information of the second access point within the self-organizing network comprises:
    referring to the backhaul SSID to send a probe request for requesting the first access point information and the second access point information within the self-organizing network; and
    obtaining the first access point information of the first access point and the second access point information of the second access point currently within the self-organizing network from the root access point.

5. The wireless communication method of claim 4, wherein the first access point information of the first access point and the second access point information of the second access point comprises the BSSID and a hop count, the hop count is a number of access points through which wireless communication between the first access point or the second access point and the root access point traverses; and the step of selecting one of the first access point and the second access point to perform the wireless network connection according to the first access point information and the second access point information comprises:
    obtaining signal quality information of each of the first access point and the second access point; and
    selecting one of the first access point and the second access point to perform the wireless network connection according to the second access point information of the second access point and the signal quality information of each of the first access point and the second access point.

6. The wireless communication method of claim 1, wherein referring to the backhaul SSID to obtain the first access point information of the first access point and the second access point information of the second access point within the self-organizing network and performing the wireless network connection by selecting one of the first access point and the second access point according to the first access point information and the second access point information are both performed in a 5 gigahertz (GHz) band.

7. The wireless communication method of claim 1, wherein after the link is established, a fronthaul SSID of the self-organizing network comprising the first access point is further obtained from the first access point based on the backhaul SSID; and the wireless communication method further comprises:
    referring to the fronthaul SSID to obtain the first access point information of the first access point from the first access point;
    wherein the step of referring to the backhaul SSID to obtain the second access point information of the second access point comprises referring to the fronthaul SSID to obtain the second access point information of the second access point.

8. The wireless communication method of claim 7, wherein the step of referring to the fronthaul SSID to obtain the first access point information of the first access point from the first access point and the step of referring to the fronthaul SSID to obtain the second access point information of the second access point within the self-organizing network comprise:
listening to a plurality of packets in the air;
identifying a plurality of specific packets with the fronthaul SSID in the plurality of packets, wherein the plurality of specific packets are sent by the first access point or the second access point; and
obtaining the first access point information of the first access point and the second access point information of the second access point according to contents of the plurality of specific packets.

9. The wireless communication method of claim 7, wherein the step of referring to the fronthaul SSID to obtain the first access point information of the first access point from the first access point and the step of referring to the fronthaul SSID to obtain the second access point information of the second access point within the self-organizing network comprise:
sending a probe request;
listening to a plurality of specific packets sent by the first access point or the second access point in response to the probe request; and
obtaining the first access point information of the first access point and the second access point information of the second access point according to contents of the plurality of specific packets.

10. The wireless communication method of claim 7, wherein the first access point is a root access point, the second access point information of the second access point comprises the BSSID and a hop count, the hop count is a number of access points through which wireless communication between the second access point and the first access point traverses; and the step of selecting one of the first access point and the second access point to perform the wireless network connection according to the first access point information and the second access point information comprises:
obtaining signal quality information of each of the first access point and the second access point; and
selecting one of the first access point and the second access point to perform the wireless network connection according to the first access point information and the second access point information and the signal quality information of each of the first access point and the second access point.

11. The wireless communication method of claim 7, wherein the second access point comprises a root access point, the first access point information and the second access point information comprise the BSSID and a hop count, the hop count is a number of access points through which wireless communication between the first access point or the second access point and the root access point traverses; and selecting one of the first access point and the second access point to perform the wireless network connection according to the first access point information and the second access point information comprises:
obtaining signal quality information of each of the first access point and the second access point; and
selecting one of the first access point and the second access point to perform the wireless network connection according to the first access point information and the second access point information and the signal quality information of each of the first access point and the second access point.

12. The wireless communication method of claim 7, wherein obtaining the fronthaul SSID of the self-organizing network from the first access point is performed in a 5 gigahertz (GHz) band, and referring to the fronthaul SSID to obtain the first access point information of the first access point from the first access point and referring to the fronthaul SSID to obtain the second access point information of the second access point within the self-organizing network are both performed in a 2.4 GHz band.

13. The wireless communication method of claim 7, wherein obtaining the fronthaul SSID of the self-organizing network comprising the first access point from the first access point is performed in a 5 gigahertz (GHz) band, and referring to the fronthaul SSID to obtain the first access point information of the first access point from the first access point and referring to the fronthaul SSID to obtain the second access point information of the second access point within the self-organizing network are both performed in a non-dynamic frequency selection (non-DFS) channel of the 5 GHz band.

14. The wireless communication method of claim 1, wherein establishing the link with the first access point is performed by using a Wi-Fi Protected Setup (WPS) mechanism.

15. A wireless communication device, comprising:
a wireless network module; and
a processor;
wherein the processor establishes a link with a first access point within a self-organizing network (SON) through the wireless network module, and obtains a backhaul service set identifier (SSID) of the self-organizing network from the first access point, wherein a backhaul wireless communication of the SON is operated on a dynamic frequency selection (DFS) channel, and an access of the SON uses a security mechanism that hides the backhaul SSID; and the processor refers to the backhaul SSID to obtain first access point information of the first access point and second access point information of a second access point within the self-organizing network, wherein each of the first access point information and the second access point information comprises a basic SSID (BSSID); and the processor selects one of the first access point and the second access point to perform a wireless network connection through the wireless network module according to the first access point information and the second access point information.

16. The wireless communication device of claim 15, wherein the first access point is a root access point, and the processor obtains first access point information of the first access point and the second access point information of the second access point currently within the self-organizing network from the first access point through the wireless network module.

17. The wireless communication device of claim 15, wherein the first access point is a root access point, and the processor refers to the backhaul SSID to send a probe request for requesting the first access point information and the second access point information within the self-organizing network through the wireless network module; and the processor obtains the first access point information of the first access point and the second access point information of the second access point currently within the self-organizing network from the root access point through the wireless network module.

18. The wireless communication device of claim 15, wherein after the processor establishes the link with the first access point through the wireless network module, the processor obtains a fronthaul SSID from the first access point, and the processor refers to the fronthaul SSID to obtain the first access point information of the first access point from the first access point.

19. The wireless communication device of claim 18, wherein the processor listens to a plurality of packets in the air through the wireless network module, and identifies a plurality of specific packets with the fronthaul SSID in the plurality of packets, wherein the plurality of specific packets are sent by the first access point or the second access point; and the processor obtains the first access point information of the first access point and the second access point information of the second access point according to contents of the plurality of specific packets.

20. The wireless communication device of claim 18, wherein the processor sends a probe request through the wireless network module, and listens to a plurality of specific packets sent by the first access point or the second access point in response to the probe request; and the processor obtains the first access point information of the first access point and the second access point information of the second access point according to contents of the plurality of specific packets.

* * * * *